(12) United States Patent
Yu et al.

(10) Patent No.: US 6,743,390 B2
(45) Date of Patent: Jun. 1, 2004

(54) STRESS RELEASE METHOD

(75) Inventors: Robert C. U. Yu, Webster, NY (US); John A. Bergfjord, Sr., Macedon, NY (US)

(73) Assignee: Xerox Corporation, Stamford, CT (US)

( * ) Notice: Subject to any disclaimer, the term of this patent is extended or adjusted under 35 U.S.C. 154(b) by 385 days.

(21) Appl. No.: 09/973,351

(22) Filed: Oct. 9, 2001

(65) Prior Publication Data

US 2003/0067097 A1 Apr. 10, 2003

(51) Int. Cl.$^7$ .................. B29C 71/00; B29C 71/02; G03G 5/00
(52) U.S. Cl. .................. 264/345; 264/348; 430/130
(58) Field of Search .............................. 264/348, 345; 430/130

(56) References Cited

U.S. PATENT DOCUMENTS

| 4,983,481 A | 1/1991 | Yu | 430/59 |
|---|---|---|---|
| 5,089,369 A | 2/1992 | Yu | 430/96 |
| 5,167,987 A | 12/1992 | Yu | 427/171 |
| 5,240,532 A | * 8/1993 | Yu | 156/137 |
| 5,606,396 A | 2/1997 | Yu et al. | 399/162 |
| 6,165,670 A | 12/2000 | Yu et al. | 430/130 |

* cited by examiner

Primary Examiner—Leo B. Tentoni
(74) Attorney, Agent, or Firm—Zosan S. Soong

(57) ABSTRACT

A method of treating a flexible multi-layer member exhibiting a glass transition temperature and including a surface layer, the method composed of: moving the member through a member path including: a contact zone defined by contact of the member with an arcuate surface including a curved contact zone region; a pre-contact member path before the contact zone; and a post-contact member path after the contact zone; heating sequentially each portion of the surface layer such that each of the heated surface layer portions has a temperature above the glass transition temperature while in the curved contact zone region; and cooling sequentially each of the heated surface layer portions while in the contact zone such that the temperature of each of the heated surface layer portions falls to below the glass transition temperature prior to each of the heated surface layer portions exiting the curved contact zone region, thereby defining a cooling region, wherein the heating is accomplished in a heating region encompassing any part or all of the contact zone outside the cooling region and a portion of the pre-contact member path adjacent the contact zone.

17 Claims, 5 Drawing Sheets

STRESS RELEASE METHOD

BACKGROUND OF THE INVENTION

Electrostatographic flexible imaging members are well known in the electrostatographic art. Typical flexible electrostatographic imaging members include, for example, (1) photosensitive members (photoreceptors) commonly utilized in electrophotographic (xerographic) processes and (2) electroreceptors such as ionographic imaging members for electrographic imaging systems. The flexible electrostatographic imaging members may be seamless or seamed belts. Typical electrophotographic imaging member belts comprise a charge transport layer and a charge generating layer on one side of a supporting substrate layer and an anticurl backing layer coated on the opposite side of the substrate layer. A typical electrographic imaging member belt does however have a more simple material structure; it comprises a dielectric imaging layer on one side of a supporting substrate and an anticurl backing layer on the opposite side of the substrate.

In a machine service environment, a flexible imaging member belt mounted on a belt supporting module is generally exposed to repetitive electrophotographic image cycling which subjects the outer-most charge transport layer to mechanical fatigue as the imaging member belt bends and flexes over the belt drive roller and all other belt module support rollers, as well as sliding bending contact above each backer bar's curving surface. This repetitive imaging member belt cycling leads to a gradual deterioration in the physical/mechanical integrity of the exposed outer charge transport layer leading to premature onset of charge transport layer fatigue cracking. The cracks developed in the charge transport layer as a result of dynamic belt fatiguing are found to manifest themselves into copy printout defects which thereby adversely affect the image quality on the receiving paper. In essence, the appearance of charge transport cracking cuts short the imaging member belt's intended functional life.

When a production web stock consisting of several thousand feet of coated multi-layered photoreceptor is obtained after finishing the charge transport layer coating/drying process, it is seen to spontaneously curl upwardly and required an anticurl backing layer applied to the backside of the substrate support, opposite to the side having the charge transport layer, to offset the curl and render flat the photoreceptor web stock. The exhibition of upward photoreceptor curling after completion of charge transport layer coating has been determined to be the consequence of thermal contraction mismatch between the applied charge transport layer and the substrate support under the conditions of elevated temperature heating/drying the wet coating and eventual cooling down to room ambient temperature. Since the charge transport layer in a typical photoreceptor device has a coefficient of thermal contraction approximately 3½ times larger than the substrate support, it does, upon cooling down to room ambient temperature, result in greater dimensional contraction than that of the substrate support causing upward photoreceptor curling which thereby requires the anticurl backing layer to balance the curl and provide flatness.

Although it may be useful in certain situations to have the anticurl backing layer to complete a typical photoreceptor web stock material package, nonetheless the application of anticurl backing layer onto the backside of the substrate support (for counter-acting the upward curling and rendering flat the photoreceptor web stock) has caused the charge transport layer to instantaneously build up an internal tension strain of about 0.28% in its material matrix. After converting the web stock into a seamed photoreceptor belt, the internal built-up strain is then cumulatively adding onto each photoreceptor bending induced strain as the belt flexes over a variety of belt module support rollers during photoreceptor belt dynamic cyclic function in a machine. The consequence of this compounding strain effect is an early onset of the charge transport layer fatigue cracking problem which then leads to undesirable printout defects in the final image copies.

Thus, there is a need, addressed by the present invention, for new methods to reduce or eliminate the built-up internal tension strain that can occur in certain flexible multi-layer members to enhance the mechanical properties of the members.

Conventional multi-layer members and methods for treating such members are disclosed in: Yu et al., U.S. Pat. No. 6,165,670; Yu et al., U.S. Pat. No. 5,606,396; Yu, U.S. Pat. No. 5,089,369; Yu, U.S. Pat. No. 5,167,987; and Yu, U.S. Pat. No. 4,983,481.

SUMMARY OF THE INVENTION

The present invention is accomplished in embodiments by providing a method of treating a flexible multi-layer member exhibiting a glass transition temperature and including a surface layer, the method comprising:

moving the member through a member path comprising: a contact zone defined by contact of the member with an arcuate surface including a curved contact zone region; a pre-contact member path before the contact zone; and a post-contact member path after the contact zone;

heating sequentially each portion of the surface layer such that each of the heated surface layer portions has a temperature above the glass transition temperature while in the curved contact zone region; and cooling sequentially each of the heated surface layer portions while in the contact zone such that the temperature of each of the heated surface layer portions falls to below the glass transition temperature prior to each of the heated surface layer portions exiting the curved contact zone region, thereby defining a cooling region, wherein the heating is accomplished in a heating region encompassing any part or all of the contact zone outside the cooling region and a portion of the pre-contact member path adjacent the contact zone.

There is also provided in embodiments a method of treating a flexible imaging member comprised of in the following sequence a substrate layer, a charge generating layer, and a charge transport layer wherein the charge transport layer exhibits a glass transition temperature, the method comprising:

moving the member through a member path comprising: a contact zone defined by contact of the member with an arcuate surface including a curved contact zone region; a pre-contact member path before the contact zone; and a post-contact member path after the contact zone;

heating sequentially each portion of the charge transport layer such that each of the heated charge transport layer portions has a temperature above the glass transition temperature while in the curved contact zone region; and cooling sequentially each of the heated charge transport layer portions while in the contact zone such that the temperature of each of the heated charge transport layer portions falls to below the glass transition temperature prior to each of the heated charge transport layer portions exiting the curved contact zone region, thereby defining a cooling region, wherein the heating is accomplished in a heating region encompassing any part or all of the contact zone outside the cooling region and a portion of the pre-contact member path adjacent the contact zone.

BRIEF DESCRIPTION OF THE DRAWINGS

Other aspects of the present invention will become apparent as the following description proceeds and upon reference to the Figures which represent exemplary embodiments.

Unless otherwise noted, the same reference numeral in different Figures refers to the same or similar feature.

DETAILED DESCRIPTION

Figure 1:
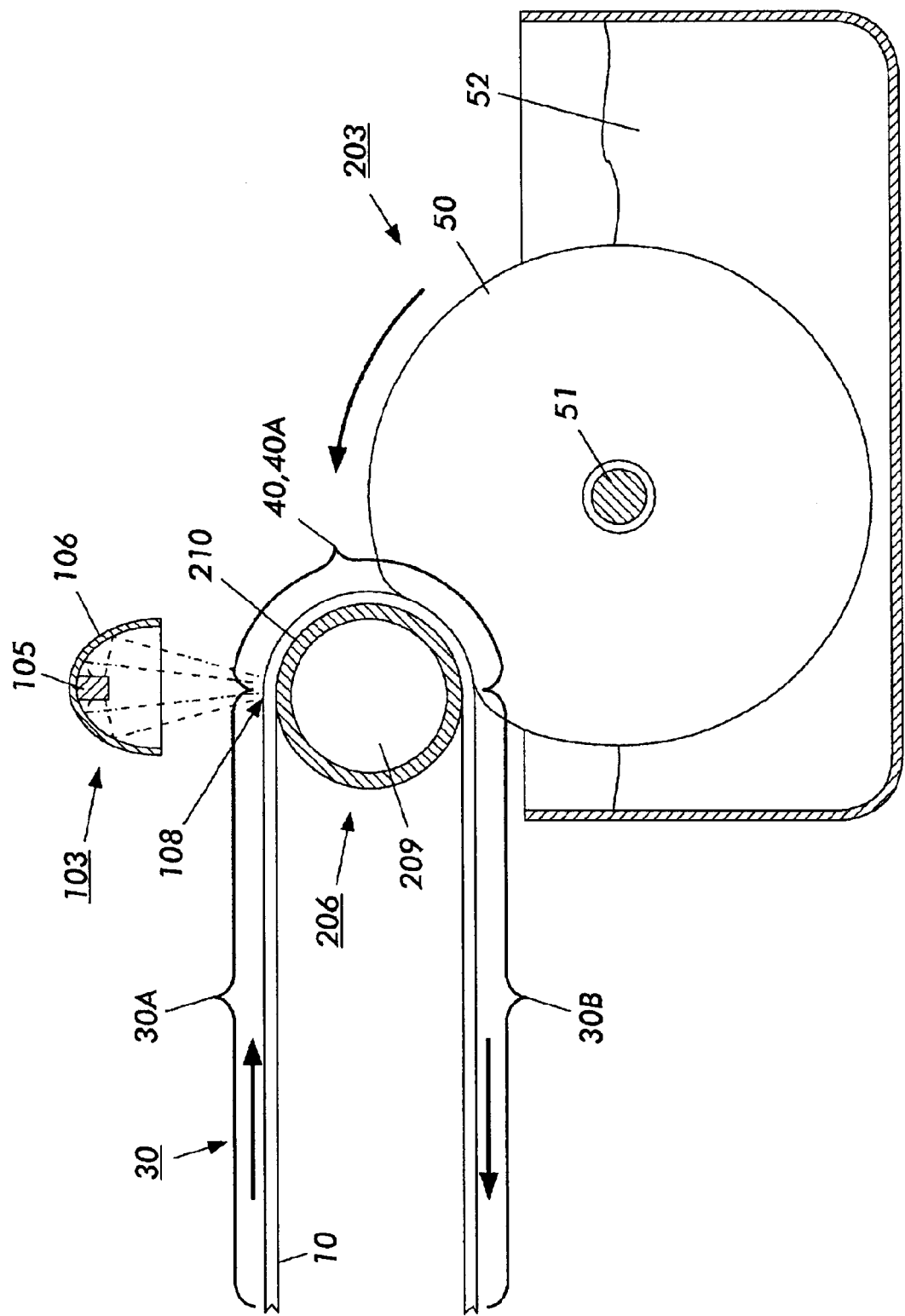
FIG. 1 is a schematic elevational view of a first embodiment of apparatus useful in accomplishing the present method.

FIG. 1 is an exemplary embodiment of apparatus useful for carrying out the present method for treating a flexible multi-layer member exhibiting a glass transition temperature ("Tg") and including a surface layer. The term "multi-layer" refers to two, three, four or more layers. The surface layer may or may not exhibit the Tg that is the subject of the present method; in embodiments, another layer of the member (such as a layer adjacent to the surface layer or a non-adjacent internal layer spaced a number of layers away from the surface layer) exhibits the Tg that is the subject of the present method while the surface layer exhibits a different Tg. As is well known, Tg is the temperature at which molecules in a rigid glass like state with restricted motion ability is transformed into a flexible state such that free molecular rotation/translation motions become predominant. The present method involves moving the member 10 through a member path 30 comprising: a contact zone 40 defined by contact of the member with an arcuate surface 210 including a curved contact zone region 40A; a pre-contact member path 30A before the contact zone 40; and a post-contact member path 30B after the contact zone.

The member 10 moves toward a free rotating component 206 (depicted in embodiments as a tube) having an arcuate outer surface 210, and a chamber 209. The member 10, which initially may be at ambient temperature of about 25° C., makes an entering contact at for example about 12 O'clock and conforms to the arcuate surface 210 of component 206. In FIG. 1, the arcuate surface is driven by the moving member 10 which causes the arcuate surface to rotate; in an alternate embodiment, the arcuate surface is non-rotatable.

The member 10 may have a tension strain ranging for example from about 0.9% to about 0.1%, particularly from about 0.6% to about 0.2%.

The speed of the member as it moves along the member path ranges for example from about 1 ft/minute to about 90 ft/minute, particularly from about 5 ft/minute to about 40 ft/minute.

The component 206 defining the arcuate surface may have an outer diameter or width ranging for example from about 0.5 inch to about 5 inches, particularly from about 0.5 inch to about 1 inch.

As the member advances into the heating region of the member path, a heating source 103 heats sequentially each portion of the surface layer to a temperature above the glass transition temperature while in the curved contact zone region. The heating occurs only in the heating region 108 of the member path. The phrase "heating region" refers to the area of the member path receiving heat from the heating source, such an area encompassing any part or all of the contact zone outside the cooling region and a portion of the pre-contact member path adjacent the contact zone.

In the depicted embodiment, the heating source 103 is a high power infrared emitting tungsten halogen quartz lamp, positioned directly above the member to bring an instant localized temperature elevation in the surface layer. In embodiments, the heating source 103 is an integrated unit having a length covering the width of the member 10 and consisting of a hemi-ellipsoidal shaped cross-section elongated reflector 106 and a halogen quartz tube 105 positioned at a focal point inside the reflector 106, such that all the infrared radiant energy emitted from tube 105 is reflected and converges at the other focal point outside the reflector 106 to give a focused heating line at the heating region 108 to quickly bring about temperature elevation. The heating region provided by for example the focused heating line may range in width (that is, in the direction of member movement) from about 3 mm to about 1 cm, particularly from about 6 mm to about 12 mm. Alternatively, the heating source may be a laser such as a carbon dioxide laser.

The heating raises each of the heated surface layer portions to a temperature ranging from about 5 to about 40 degrees C. above the glass transition temperature, particularly from about 10 to about 20 degrees C. above the glass transition temperature. The electrical power input to the heating source can be adjusted incrementally to produce the desired heat energy output. The temperature of the member can be monitored with an infrared camera.

The present method then cools sequentially each of the heated surface layer portions while in the contact zone such that the temperature of each of the heated surface layer portions falls to below the glass transition temperature prior to each of the heated surface layer portions exiting the curved contact zone region, thereby defining a cooling region. The phrase "cooling region" refers to the area of the member path after the heating region and before the post-contact member path, even including any place where the temperature of the surface layer portions has not yet fallen below the glass transition temperature. It is apparent that the "cooling region" excludes any place in the member path subjected to heating by the heating source.

After advancing into the cooling region, each of the heated surface layer portions after exposure to the heating source 103 will then quickly cool down when the member is transported away from the heat source 103, through for instance direct heat conduction away from the member to component 206 as well as heat convection to the ambient air (due to movement of the member along the member path). A final cooling down can be achieved by an optional cooling system 203 including a free rotating soft hydrophilic foam roll 50 (saturated with a cooling liquid) making compression contact with the member at a position spanning about 4 O'clock to about 6 O'clock to assure temperature lowering of the exiting surface layer portions to a temperature of at least about 20° C. particularly at least about 40° C.) below the glass transition temperature to yield permanent stress or strain release. In embodiments of the cooling system 203, the hydrophilic cooling roll 50 is a soft idling foam roll having a free rotating axial shaft 51 and is partially submersed, but totally saturated, in a cooling liquid bath 52 (e.g., water, alcohol, and the like, or a mixture thereof) to provide effective cooling result. The temperature of the cooling liquid bath ranges for example from about 0 to about 25 degrees C., particularly from about 5 to about 10 degrees C. The annular chamber 209 of the treatment component 206 can include just air at ambient temperature; or a coolant such as sub-cooled water, liquid nitrogen, alcohol and the like, can be passed through the annular chamber 209. The temperature of the water and/or alcohol coolant passing through the chamber ranges for example from about 0 to about 25 degrees C., particularly from about 5 to about 10 degrees C.

In embodiments, to enhance the stress or strain release effect of the present method, the member can be transported through the member path at a speed described herein such that the heat extraction from the member by the contacting cooling foam roll 50 is effectual to bring down the temperature of each of the surface layer portions to significantly lower than the Tg prior to each of the surface layer portions exiting the curved contact zone region.

Figure 2:
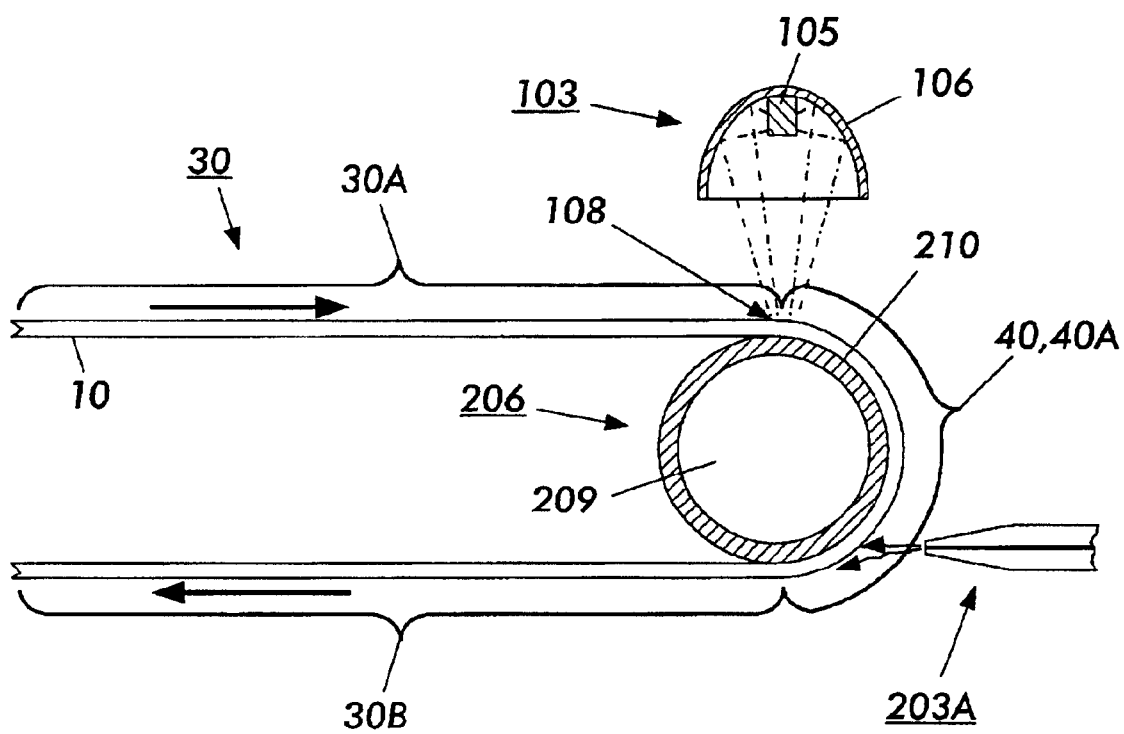
FIG. 2 is a schematic elevational view of a second embodiment of apparatus useful in accomplishing the present method.

FIG. 2 is another embodiment of apparatus useful for carrying out the present invention, in which the cooling system 203 utilized in FIG. 1 is replaced with a different cooling system 203A depicted as an air impinging knife. Besides air, cooling by cooling system 203A may also be achieved by using impinging $CO_2$ snow, super-cooled nitrogen gas, liquid water, or alcohol and the like. Since impinging air, nitrogen, $CO_2$, liquid alcohol, or liquid water is a forced convection cooling process, the impinging cooling medium can quickly bring the temperature of the heated surface layer portions down to below the Tg. The temperature of the impinging cooling medium, if gaseous, can range for example from about −10° C. to about 20° C., particularly from about −5° C. to about 5° C. However, for a high heat conducting liquid such as water or alcohol, the temperature of the impinging liquid is for example from about 2° C. to about 25° C., particularly from about 5° C. to about 10° C.

Thus, as discussed herein, cooling can include transferring heat away from the member via heat conduction through the arcuate surface and also via heat convection to ambient air (e.g., forced heat convection using for example a fan or natural heat convection). In embodiments, cooling further includes transferring heat away from the member via heat conduction or heat convection to a coolant other than ambient air. In other embodiments, cooling is accomplished by relying only on transferring heat away from the member via heat conduction through the arcuate surface and/or via heat convection to ambient air, without transferring heat away from the member via heat conduction or heat convection to a coolant other than ambient air, i.e., cooling system 203/203A is absent in certain embodiments.

The heating and cooling features of the present method are discussed with respect to the surface layer whether that is the top layer or the bottom layer of the member. Due to the phenomenon of heating conduction, however, the heating and cooling of the surface layer may affect any layer or layers above or below the surface layer in a manner similar to the heating/cooling experienced by the surface layer. So the present method can be used in embodiments to treat via heat conduction other layer or layers of the member in addition to the surface layer. To treat one or more additional layers where each layer has a glass transition temperature different from that of the surface layer, one applies sufficient heat to the member in the heating region to heat the surface layer and the additional layer(s) to above the highest glass transition temperature of the various layers targeted for stress release. Then, according to the present method, one cools in the cooling region the surface layer and the additional layer(s) to below the lowest glass transition temperature of the various layers targeted for stress release.

In certain embodiments, where the surface layer has a Tg higher than the Tg of an adjacent layer and the adjacent layer is the layer targeted for stress release, the present method applies heat in the heating region to heat the surface layer and the adjacent layer to a temperature that exceeds the Tg of the adjacent layer; it is optional to make the temperature exceed the Tg of the surface layer as well if the surface layer is not targeted for stress release. Then, one cools in the cooling region the surface layer and the adjacent layer to below the Tg of the adjacent layer.

Thus, in embodiments, the member further includes an additional layer, wherein there occurs the following: (1) due to heat conduction within the member, the heating sequentially of each portion of the surface layer also causes heating sequentially of each portion of the additional layer such that each of the heated additional layer portions has a temperature above the glass transition temperature while in the curved contact zone region; and (2) wherein due to heat conduction within the member, the cooling sequentially of each of the heated surface layer portions also causes cooling sequentially of each portion of the additional layer such that the temperature of each of the heated additional layer portions falls to below the glass transition temperature prior to each of the heated additional layer portions exiting the curved contact zone region.

The glass transition temperatures of the various layers of the member can differ by a value ranging for example from about 5 to about 30 degrees C., particularly from about 10 to about 20 degrees C.

Figure 3:
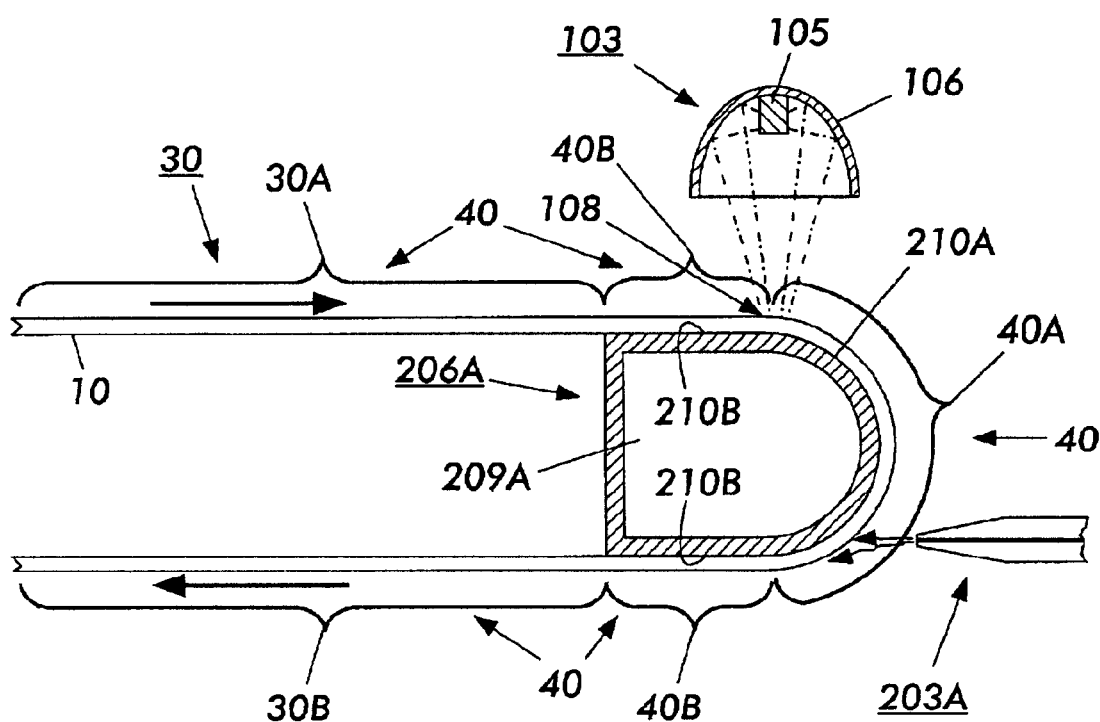
FIG. 3 is a schematic elevational view of a third embodiment of apparatus useful in accomplishing the present method.

In FIGS. 1–2, the contact zone 40 consists only of the curved contact zone region 40A. In embodiments, the contact zone can include one or two straight contact zone regions adjacent the curved contact zone region. FIG. 3 depicts an elongated non-rotating component 206A (with chamber 209A) defining an arcuate surface 210A between two straight surfaces 210B. Accordingly, the curved contact zone region 40A disposed between the two straight contact zone regions 40B collectively are contact zone 40.

Figure 4:
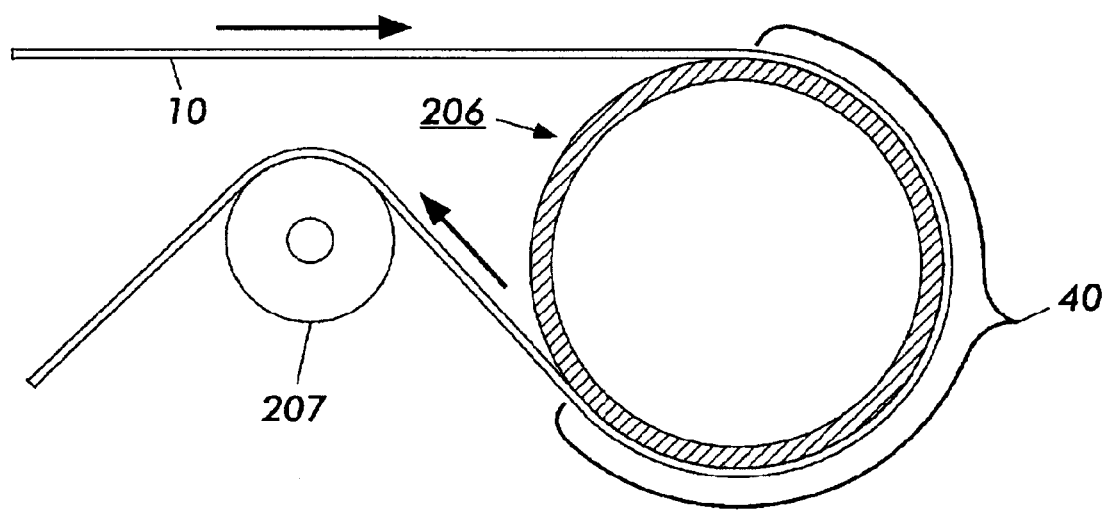
FIG. 4 is a schematic elevational view of a fourth embodiment of apparatus useful for accomplishing the present method.

The member contacts the arcuate surface at a wrap angle ranging for example from about 30 to about 350 degrees, particularly from about 30 to about 180 degrees. A wrap angle of 180 degrees is illustrated in FIGS. 1–3. FIG. 4 depicts a wrap angle much greater than 180 degrees by engaging the member 10 with component 206 and a rotating roller 207 to create a long contact zone 40.

The member may be any flexible multi-layer component that can be cycled over one or more rollers. The member can be an imaging member such as an electrostatographic imaging member, and especially an electrophotographic imaging member (e.g., photoreceptor). In other embodiments, the member can be a conveyor belt, an intermediate image transfer belt, or the like.

In embodiments, the member is moved at a constant speed along the member path including through the contact zone.

The phrase "constant speed" means steady movement without stop and go movement, pausing or varying the speed. In other embodiments, the member is moved at a non-constant speed along the member path including through the contact zone. The phrase "non-constant speed" means stop and go movement, pausing or varying the speed. Each pause may last for example from about 3 seconds to about 1 minute. The member may be subjected to the present method one, two, or more times; in embodiments, the member is subjected to the present method only one time.

The present method reduces or eliminates the built-up internal tension strain within the member, thereby providing any or all of the following benefits: (1) eliminates or reduces edge curling; (2) surface layer cracking life extension; and (3) renders optional the use of an anticurl backing layer for an imaging member.

Additional processing of the member can occur using conventional techniques. For example, where the member is an imaging member web-stock, one can form a seamed imaging belt using the joining techniques described for example in U.S. Pat. No. 5,688,355, the disclosure of which is totally incorporated herein by reference.

Figure 5:
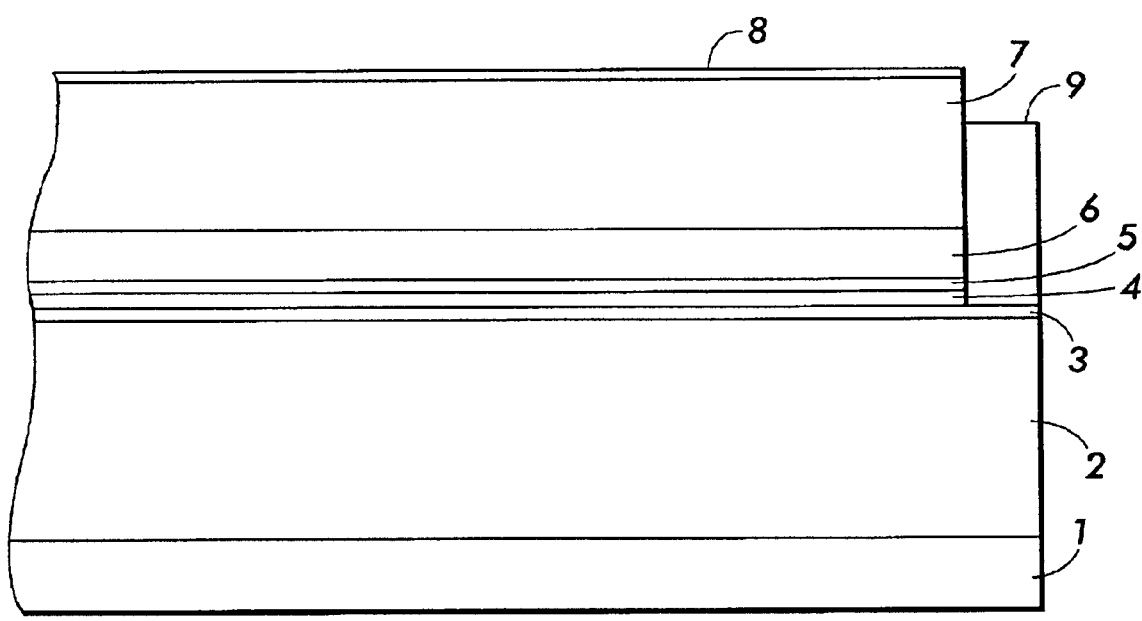
FIG. 5 is a schematic view along the width of one embodiment of the multi-layer member.

In FIG. 5, an exemplary imaging member is provided with an anti-curl layer 1, a supporting substrate 2, an electrically conductive ground plane 3, a charge blocking layer 4, an adhesive layer 5, a charge generating layer 6, a charge transport layer 7, an optional overcoating layer 8, and a ground strip 9.

The Anti-Curl Layer

For some applications, an optional anti-curl layer 1 can be provided, which comprises film-forming organic or inorganic polymers that are electrically insulating or slightly semi-conductive. The anti-curl layer provides flatness and/or abrasion resistance.

Anti-curl layer 1 can be formed at the back side of the substrate 2, opposite the imaging layers. The anti-curl layer may include, in addition to the film-forming resin, an adhesion promoter polyester additive. Examples of film-forming resins useful as the anti-curl layer include, but are not limited to, polyacrylate, polystyrene, poly(4,4'-isopropylidene diphenylcarbonate), poly(4,4'-cyclohexylidene diphenylcarbonate), mixtures thereof and the like.

Additives may be present in the anti-curl layer in the range of about 0.5 to about 40 weight percent of the anti-curl layer. Preferred additives include organic and inorganic particles which can further improve the wear resistance and/or provide charge relaxation property. Preferred organic particles include Teflon powder, carbon black, and graphite particles. Preferred inorganic particles include insulating and semiconducting metal oxide particles such as silica, zinc oxide, tin oxide and the like. Another semiconducting additive is the oxidized oligomer salts as described in U.S. Pat. No. 5,853,906. The preferred oligomer salts are oxidized N,N,N',N'-tetra-p-tolyl-4,4'-biphenyldiamine salt.

Typical adhesion promoters useful as additives include, but are not limited to, duPont 49,000 (duPont), Vitel PE-100, Vitel PE-200, Vitel PE-307 (Goodyear), mixtures thereof and the like. Usually from about 1 to about 15 weight percent adhesion promoter is selected for film-forming resin addition, based on the weight of the film-forming resin.

The thickness of the anti-curl layer is typically from about 3 micrometers to about 35 micrometers and, preferably, about 14 micrometers. However, thicknesses outside these ranges can be used.

The anti-curl coating can be applied as a solution prepared by dissolving the film-forming resin and the adhesion promoter in a solvent such as methylene chloride. The solution may be applied to the rear surface of the supporting substrate (the side opposite the imaging layers) of the photoreceptor device, for example, by web coating or by other methods known in the art. Coating of the overcoat layer and the anti-curl layer can be accomplished simultaneously by web coating onto a multi-layer photoreceptor comprising a charge transport layer, charge generation layer, adhesive layer, blocking layer, ground plane and substrate. The wet film coating is then dried to produce the anti-curl layer 1.

The Supporting Substrate

As indicated above, the photoreceptors are prepared by first providing a substrate 2, i.e., a support. The substrate can be opaque or substantially transparent and can comprise any of numerous suitable materials having given required mechanical properties.

The substrate can comprise a layer of electrically non-conductive material or a layer of electrically conductive material, such as an inorganic or organic composition. If a non-conductive material is employed, it is necessary to provide an electrically conductive ground plane over such non-conductive material. If a conductive material is used as the substrate, a separate ground plane layer may not be necessary.

The substrate is flexible and can have any of a number of different configurations, such as, for example, a sheet, a scroll, an endless flexible belt, a web, and the like.

Various resins can be used as electrically non-conducting materials, including, but not limited to, polyesters, polycarbonates, polyamides, polyurethanes, and the like. Such a substrate preferably comprises a commercially available biaxially oriented polyester known as MYLAR™, available from E. I. duPont de Nemours & Co., MELINEX™, available from ICI Americas Inc., or HOSTAPHAN™, available from American Hoechst Corporation. Other materials of which the substrate may be comprised include polymeric materials, such as polyvinyl fluoride, available as TEDLAR™ from E. I. duPont de Nemours & Co., polyethylene and polypropylene, available as MARLEX™ from Phillips Petroleum Company, polyphenylene sulfide, RYTON™ available from Phillips Petroleum Company, and polyimides, available as KAPTON™ from E. I. duPont de Nemours & Co. The photoreceptor can also be coated on an insulating plastic drum, provided a conducting ground plane has previously been coated on its surface, as described above. Such substrates can either be seamed or seamless.

When a conductive substrate is employed, any suitable conductive material can be used. For example, the conductive material can include, but is not limited to, metal flakes, powders or fibers, such as aluminum, titanium, nickel, chromium, brass, gold, stainless steel, carbon black, graphite, or the like, in a binder resin including metal oxides, sulfides, silicides, quaternary ammonium salt compositions, conductive polymers such as polyacetylene or its pyrolysis and molecular doped products, charge transfer complexes, and polyphenyl silane and molecular doped products from polyphenyl silane.

The preferred thickness of the substrate depends on numerous factors, including the required mechanical performance and economic considerations. The thickness of the substrate is typically within a range of from about 65 micrometers to about 150 micrometers, and preferably is from about 75 micrometers to about 125 micrometers for optimum flexibility and minimum induced surface bending stress when cycled around small diameter rollers, e.g., 19 mm diameter rollers. The substrate for a flexible belt can be of substantial thickness, for example, over 200 micrometers, or of minimum thickness, for example, less than 50 micrometers, provided there are no adverse effects on the final photoconductive device.

The surface of the substrate to which a layer is to be applied is preferably cleaned to promote greater adhesion of such a layer. Cleaning can be effected, for example, by exposing the surface of the substrate layer to plasma discharge, ion bombardment, and the like. Other methods, such as solvent cleaning, can be used.

Regardless of any technique employed to form a metal layer, a thin layer of metal oxide generally forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer.

The Electrically Conductive Ground Plane

As stated above, photoreceptors prepared in accordance with the present invention comprise a substrate that is either electrically conductive or electrically non-conductive. When a non-conductive substrate is employed, an electrically conductive ground plane 3 must be employed, and the ground plane acts as the conductive layer. When a conductive substrate is employed, the substrate can act as the conductive layer, although a conductive ground plane may also be provided.

If an electrically conductive ground plane is used, it is positioned over the substrate. Suitable materials for the electrically conductive ground plane include, but are not limited to, aluminum, zirconium, niobium, tantalum, vanadium, hafnium, titanium, nickel, stainless steel, chromium, tungsten, molybdenum, copper, and the like, and mixtures and alloys thereof. In embodiments, aluminum, titanium, and zirconium are preferred.

The ground plane can be applied by known coating techniques, such as solution coating, vapor deposition, and sputtering. A preferred method of applying an electrically conductive ground plane is by vacuum deposition. Other suitable methods can also be used.

Preferred thicknesses of the ground plane are within a substantially wide range, depending on the optical transparency and flexibility desired for the electrophotoconductive member. Accordingly, for a flexible photoresponsive imaging device, the thickness of the conductive layer is preferably between about 20 angstroms and about 750 angstroms; more preferably, from about 50 angstroms to about 200 angstroms for an optimum combination of electrical conductivity, flexibility, and light transmission. However, the ground plane can, if desired, be opaque.

The Charge Blocking Layer

After deposition of any electrically conductive ground plane layer, a charge blocking layer 4 can be applied thereto. Electron blocking layers for positively charged photoreceptors permit holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer can be utilized.

If a blocking layer is employed, it is preferably positioned over the electrically conductive layer. The term "over," as used herein in connection with many different types of layers, should be understood as not being limited to instances wherein the layers are contiguous. Rather, the term refers to relative placement of the layers and encompasses the inclusion of unspecified intermediate layers.

The blocking layer 4 can include polymers, such as polyvinyl butyral, epoxy resins, polyesters, polysiloxanes, polyamides, polyurethanes, and the like; nitrogen-containing siloxanes or nitrogen-containing titanium compounds, such as trimethoxysilyl propyl ethylene diamine, N-beta(aminoethyl) gamma-aminopropyl tri-methoxy silane, isopropyl 4-aminobenzene sulfonyl titanate, di(dodecylbenezene sulfonyl) titanate, isopropyl di(4-aminobenzoyl)isostearoyl titanate, isopropyl tri(N-ethyl amino) titanate, isopropyl trianthranil titanate, isopropyl tri(N,N-dimethyl-ethyl amino) titanate, titanium-4-amino benzene sulfonate oxyacetate, titanium 4-aminobenzoate isostearate oxyacetate, gamma-aminobutyl methyl dimethoxy silane, gamma-aminopropyl methyl dimethoxy silane, and gamma-aminopropyl trimethoxy silane, as disclosed in U.S. Pat. Nos. 4,338,387, 4,286,033, and 4,291,110.

A preferred hole blocking layer comprises a reaction product of a hydrolyzed silane or a mixture of hydrolyzed silanes and the oxidized surface of a metal ground plane layer. The oxidized surface inherently forms on the outer surface of most metal ground plane layers when exposed to air after deposition. This combination enhances electrical stability at low relative humidity. The hydrolyzed silanes can then be used as is well known in the art. For example, see U.S. Pat. No. 5,091,278 to Teuscher et al.

The blocking layer 4 should be continuous and can have a thickness of up to 2 micrometers depending on the type of material used.

However, the blocking layer preferably has a thickness of less than about 0.5 micrometer because greater thicknesses may lead to undesirably high residual voltage. A blocking layer between about 0.005 micrometer and about 0.3 micrometer is satisfactory for most applications because charge neutralization after the exposure step is facilitated and good electrical performance is achieved. A thickness between about 0.03 micrometer and about 0.06 micrometer is preferred for blocking layers for optimum electrical behavior.

The blocking layer 4 can be applied by any suitable technique, such as spraying, dip coating, draw bar coating, gravure coating, silk screening, air knife coating, reverse roll coating, vacuum deposition, chemical treatment, and the like. For convenience in obtaining thin layers, the blocking layer is preferably applied in the form of a dilute solution, with the solvent being removed after deposition of the coating by conventional techniques, such as by vacuum, heating, and the like. Generally, a weight ratio of blocking layer material and solvent of between about 0.5:100 to about 5.0:100 is satisfactory for spray coating.

The Adhesive Layer

An intermediate layer 5 between the blocking layer and the charge generating layer may, if desired, be provided to promote adhesion.

Additionally, adhesive layers can be provided, if necessary, between any of the layers in the photoreceptors to ensure adhesion of any adjacent layers. Alternatively, or in addition, adhesive material can be incorporated into one or both of the respective layers to be adhered. Such optional adhesive layers preferably have thicknesses of about 0.001 micrometer to about 0.2 micrometer. Such an adhesive layer can be applied, for example, by dissolving adhesive material in an appropriate solvent, applying by hand, spraying, dip coating, draw bar coating, gravure coating, silk screening, air knife coating, vacuum deposition, chemical treatment, roll coating, wire wound rod coating, and the like, and drying to remove the solvent. Suitable adhesives include, for example, film-forming polymers, such as polyester, dupont 49,000 (available from E. I. duPont de Nemours & Co.), Vitel PE-100 (available from Goodyear Tire and Rubber Co.), polyvinyl butyral, polyvinyl pyrrolidone, polyurethane, polymethyl methacrylate, and the like.

The Imaging Layer(s)

In fabricating a photosensitive imaging member, a charge generating material (CGM) and a charge transport material (CTM) may be deposited onto the substrate surface either in a laminate type configuration where the CGM and CTM are in different layers or in a single layer configuration where the CGM and CTM are in the same layer along with a binder resin. The photoreceptors embodying the present invention can be prepared by applying over the electrically conductive layer the charge generation layer 6 and, optionally, a charge transport layer 7. In embodiments, the charge generation layer and, when present, the charge transport layer, may be applied in either order.

Illustrative organic photoconductive charge generating materials include azo pigments such as Sudan Red, Dian Blue, Janus Green B, and the like; quinone pigments such as Algol Yellow, Pyrene Quinone, Indanthrene Brilliant Violet RRP, and the like; quinocyanine pigments; perylene pigments such as benzimidazole perylene; indigo pigments such as indigo, thioindigo, and the like; bisbenzoimidazole pigments such as Indofast Orange, and the like; phthalocyanine pigments such as copper phthalocyanine, aluminochloro-phthalocyanine, hydroxygallium phthalocyanine, and the like; quinacridone pigments; or azulene compounds. Suitable inorganic photoconductive charge generating materials include for example cadium sulfide, cadmium sulfoselenide, cadmium selenide, crystalline and amorphous selenium, lead oxide and other chalcogenides. Alloys of selenium are encompassed by embodiments of the instant invention and include for instance selenium-arsenic, selenium-tellurium-arsenic, and selenium-tellurium.

Any suitable inactive resin binder material may be employed in the charge generating layer. Typical organic resinous binders include polycarbonates, acrylate polymers, methacrylate polymers, vinyl polymers, cellulose polymers, polyesters, polysiloxanes, polyamides, polyurethanes, epoxies, polyvinylacetals, and the like.

To create a dispersion useful as a coating composition, a solvent is used with the charge generating material and the optional resin binder. The solvent can be for example cyclohexanone, methyl ethyl ketone, tetrahydrofuran, alkyl acetate, and mixtures thereof. The alkyl acetate (such as butyl acetate and amyl acetate) can have from 3 to 5 carbon atoms in the alkyl group. The amount of solvent in the composition ranges for example from about 70% to about 98% by weight, based on the weight of the composition.

The amount of the charge generating material in the composition ranges for example from about 0.5% to about 5% by weight, based on the weight of the composition including a solvent. The amount of photoconductive particles (i.e, the charge generating material) dispersed in a dried photoconductive coating varies to some extent with the specific photoconductive pigment particles selected. For example, when phthalocyanine organic pigments such as titanyl phthalocyanine and metal-free phthalocyanine are utilized, satisfactory results are achieved when the dried photoconductive coating comprises between about 50 percent by weight and about 90 percent by weight of all phthalocyanine pigments based on the total weight of the dried photoconductive coating. Since the photoconductive characteristics are affected by the relative amount of pigment per square centimeter coated, a lower pigment loading may be utilized if the dried photoconductive coating layer is thicker. Conversely, higher pigment loadings are desirable where the dried photoconductive layer is to be thinner.

Generally, satisfactory results are achieved with an average photoconductive particle size of less than about 0.6 micrometer when the photoconductive coating is applied by dip coating. Preferably, the average photoconductive particle size is less than about 0.4 micrometer. Preferably, the photoconductive particle size is also less than the thickness of the dried photoconductive coating in which it is dispersed.

The weight ratio of the charge generating material ("CGM") to present polymeric compound ("binder") ranges from 40 (CGM):60 (binder) to 70 (CGM):30 (binder).

For multilayered photoreceptors comprising a charge generating layer (also referred herein as a photoconductive layer) and a charge transport layer, satisfactory results may be achieved with a dried photoconductive layer coating thickness of between about 0.1 micrometer and about 10 micrometers. Preferably, the photoconductive layer thickness is between about 0.2 micrometer and about 4 micrometers. However, these thicknesses also depend upon the pigment loading. Thus, higher pigment loadings permit the use of thinner photoconductive coatings. Thicknesses outside these ranges can be selected providing the objectives of the present invention are achieved.

Any suitable technique may be utilized to disperse the photoconductive particles in the binder and solvent of the coating composition. Typical dispersion techniques include, for example, ball milling, roll milling, milling in vertical attritors, sand milling, and the like. Typical milling times using a ball roll mill is between about 4 and about 6 days.

Charge transport materials include an organic polymer or non-polymeric material capable of supporting the injection of photoexcited holes or transporting electrons from the photoconductive material and allowing the transport of these holes or electrons through the organic layer to selectively dissipate a surface charge. Illustrative charge transport materials include for example a positive hole transporting material selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and hydrazone compounds. Typical hole transport materials include electron donor materials, such as carbazole; N-ethyl carbazole; N-isopropyl carbazole; N-phenyl carbazole; tetraphenylpyrene; 1-methyl pyrene; perylene; chrysene; anthracene; tetraphene; 2-phenyl naphthalene; azopyrene; 1-ethyl pyrene; acetyl pyrene; 2,3-benzochrysene; 2,4-benzopyrene; 1,4-bromopyrene; poly (N-vinylcarbazole); poly(vinylpyrene); poly(-vinyltetraphene); poly(vinyltetracene) and poly (vinylperylene). Suitable electron transport materials include electron acceptors such as 2,4,7-trinitro-9-fluorenone; 2,4,5,7-tetranitro-fluorenone; dinitroanthracene; dinitroacridene; tetracyanopyrene and dinitroanthraquinone.

Any suitable inactive resin binder may be employed in the charge transport layer. Typical inactive resin binders soluble in methylene chloride include polycarbonate resin, polyvinylcarbazole, polyester, polyarylate, polystyrene, polyacrylate, polyether, polysulfone, and the like. Molecular weights can vary from about 20,000 to about 1,500,000.

Any suitable technique may be utilized to apply the charge transport layer and the charge generating layer to the substrate. Typical coating techniques include dip coating, roll coating, spray coating, rotary atomizers, and the like. The coating techniques may use a wide concentration of solids. Preferably, the solids content is between about 2 percent by weight and 8 percent by weight based on the total weight of the dispersion. The expression "solids" refers to the photoconductive pigment particles and binder components of the charge generating coating dispersion and to the charge transport particles and binder components of the charge transport coating dispersion. These solids concentrations are useful in dip coating, roll, spray coating, and the like. Generally, a more concentrated coating dispersion is preferred for roll coating. Drying of the deposited coating may be effected by any suitable conventional technique such as oven drying, infra-red radiation drying, air drying and the like. Generally, the thickness of the charge generating layer ranges from about 0.1 micrometer to about 3 micrometers and the thickness of the transport layer is between about 5 micrometers to about 100 micrometers, but thicknesses outside these ranges can also be used. In general, the ratio of the thickness of the charge transport layer to the charge generating layer is preferably maintained from about 2:1 to 200:1 and in some instances as great as 400:1.

The Overcoating Layer

Embodiments in accordance with the present invention can, optionally, further include an overcoating layer or layers 8, which, if employed, are positioned over the charge generation layer or over the charge transport layer. This layer comprises organic polymers or inorganic polymers that are electrically insulating or slightly semi-conductive.

Such a protective overcoating layer includes a film forming resin binder optionally doped with a charge transport material.

Any suitable film-forming inactive resin binder can be employed in the overcoating layer. For example, the film forming binder can be any of a number of resins, such as polycarbonates, polyarylates, polystyrene, polysulfone, polyphenylene sulfide, polyetherimide, polyphenylene vinylene, and polyacrylate. The resin binder used in the overcoating layer can be the same or different from the resin binder used in the anti-curl layer or in any charge transport layer that may be present. The binder resin should preferably have a Young's modulus greater than about $2 \times 10^5$ psi, a break elongation no less than 10%, and a glass transition temperature greater than about 150 degrees C. The binder may further be a blend of binders. The preferred polymeric film forming binders include MAKROLON™, a polycarbonate resin having a weight average molecular weight of about 50,000 to about 100,000 available from Farbenfabriken Bayer A. G., 4,4'-cyclohexylidene diphenyl polycarbonate, available from Mitsubishi Chemicals, high molecular weight LEXAN™ 135, available from the General Electric Company, ARDEL™ polyarylate D-100, available from Union Carbide, and polymer blends of MAKROLON™ and the copolyester VITEL™ PE-100 or VITEL™ PE-200, available from Goodyear Tire and Rubber Co.

In embodiments, a range of about 1% by weight to about 10% by weight of the overcoating layer of VITEL™ copolymer is preferred in blending compositions, and, more preferably, about 3% by weight to about 7% by weight. Other polymers that can be used as resins in the overcoat layer include DUREL™ polyarylate from Celanese, polycarbonate copolymers LEXAN™ 3250, LEXAN™ PPC 4501, and LEXAN™ PPC 4701 from the General Electric Company, and CALIBRE™ from Dow.

Additives may be present in the overcoating layer in the range of about 0.5 to about 40 weight percent of the overcoating layer. Preferred additives include organic and inorganic particles which can further improve the wear resistance and/or provide charge relaxation property. Preferred organic particles include Teflon powder, carbon black, and graphite particles. Preferred inorganic particles include insulating and semiconducting metal oxide particles such as silica, zinc oxide, tin oxide and the like. Another semiconducting additive is the oxidized oligomer salts as described in U.S. Pat. No. 5,853,906. The preferred oligomer salts are oxidized N,N,N',N'-tetra-p-toly4,4'-biphenyldiamine salt.

The overcoating layer can be prepared by any suitable conventional technique and applied by any of a number of application methods. Typical application methods include, for example, hand coating, spray coating, web coating, dip coating and the like. Drying of the deposited coating can be effected by any suitable conventional techniques, such as oven drying, infrared radiation drying, air drying, and the like.

Overcoatings of from about 3 micrometers to about 7 micrometers are effective in preventing charge transport molecule leaching, crystallization, and charge transport layer cracking. Preferably, a layer having a thickness of from about 3 micrometers to about 5 micrometers is employed.

The Ground Strip

Ground strip 9 can comprise a film-forming binder and electrically conductive particles. Cellulose may be used to disperse the conductive particles. Any suitable electrically conductive particles can be used in the electrically conductive ground strip layer 9. The ground strip 9 can, for example, comprise materials that include those enumerated in U.S. Pat. No. 4,664,995. Typical electrically conductive particles include, but are not limited to, carbon black, graphite, copper, silver, gold, nickel, tantalum, chromium, zirconium, vanadium, niobium, indium tin oxide, and the like.

The electrically conductive particles can have any suitable shape. Typical shapes include irregular, granular, spherical, elliptical, cubic, flake, filament, and the like. Preferably, the electrically conductive particles should have a particle size less than the thickness of the electrically conductive ground strip layer to avoid an electrically conductive ground strip layer having an excessively irregular outer surface. An average particle size of less than about 10 micrometers generally avoids excessive protrusion of the electrically conductive particles at the outer surface of the dried ground strip layer and ensures relatively uniform dispersion of the particles through the matrix of the dried ground strip layer. Concentration of the conductive particles to be used in the ground strip depends on factors such as the conductivity of the specific conductive materials utilized.

In embodiments, the ground strip layer may have a thickness of from about 7 micrometers to about 42 micrometers and, preferably, from about 14 micrometers to about 27 micrometers.

The invention will now be described in detail with respect to specific preferred embodiments thereof, it being understood that these examples are intended to be illustrative only and the invention is not intended to be limited to the materials, conditions, or process parameters recited herein. All percentages and parts are by weight unless otherwise indicated.

CONTROL EXAMPLE I

A flexible electrophotographic imaging member web stock was prepared by providing a 0.01 micrometer thick titanium layer coated onto a flexible biaxially oriented polynaphthalate substrate support layer (available from ICI Americas, Inc.) having a thermal contraction coefficient of about $1.8 \times 10^{-5}/°$ C., a glass transition temperature Tg of 130° C., and a thickness of 3½ mils or 88.7 micrometers, and applying thereto, by a gravure coating process, a solution containing 10 grams gamma-aminopropyltriethoxy silane, 10.1 grams distilled water, 3 grams acetic acid, 684.8 grams of 200 proof denatured alcohol and 200 grams heptane. This layer was then dried at 125° C. in a forced air oven. The resulting blocking layer had an average dry thickness of 0.05 micrometer measured with an ellipsometer.

An adhesive interface layer was then extrusion coated by applying to the blocking layer a wet coating containing 5 percent by weight based on the total weight of the solution of polyester adhesive (Mor-Ester 49,000, available from Morton International, Inc.) in a 70.30 volume ratio mixture of tetrahydrofuran/cyclohexanone. The resulting adhesive interface layer, after passing through an oven, had a dry thickness of 0.095 micrometer. The adhesive interface layer was thereafter coated, by extrusion, with a photogenerating layer containing 7.5 percent by volume trigonal Se, 25 percent by volume N,N'-diphenyl-N,N'-bis(3-methylphenyl)-1,1'-biphenyl-4,4'-diamine, and 67.5 percent by volume polyvinylcarbazole. This photogenerating layer was prepared by introducing 8 grams polyvinyl carbazole and 140 mls of a 1:1 volume ratio of a mixture of tetrahydrofuran and toluene into a 20 oz. amber bottle. To this solution was added 8 grams of trigonal selenium and 1,000 grams of ⅛ inch (3.2 millimeter) diameter stainless steel shot. This mixture was then placed on a ball mill for 72 to 96 hours. Subsequently, 50 grams of polyvinyl carbazole and 2.0 grams of N,N'-diphenyl-N,N'bis(3-methylphenyl)-1,1'-biphenyl-4,4'-diamine dissolved in 75 ml of 1:1 volume ratio of tetrahydrofuran/toluene. This slurry was then placed on a shaker for 10 minutes. The resulting slurry was thereafter extrusion coated onto the adhesive interface layer to form a coating layer having a wet thickness of 0.5 mil (12.7 micrometers). However, a strip about 10 mm wide along one edge of the substrate bearing the blocking layer and the adhesive layer was deliberately left uncoated by any of the photogenerating layer material to facilitate adequate electrical contact by a ground strip layer that was applied later. This photogenerating layer was dried at 125° C. to form a dry photogenerating layer 18 having a thickness of 2.0 micrometers.

This coated imaging member web was simultaneously extrusion overcoated with a charge transport layer ("CTL") and a ground strip layer using a 3 mil gap Bird applicator. The charge transport layer was prepared by introducing into an amber glass bottle a weight ratio of 1:1 N,N'-diphenyl-N,N'-bis(3-methylphenyl)-1,1'-biphenyl-4,4'-diamine and Makrolon 5705, a polycarbonate resin having a weight average molecular weight of about 120,000 commercially available from Farbensabricken Bayer A. G. The resulting mixture was dissolved to give a 15 percent by weight solids in 85 percent by weight methylene chloride. This solution was applied over the photogenerator layer to form a coating which, upon drying, gave a CTL thickness of 24 micrometers, a thermal contraction coefficient of $6.5 \times 10^{-5}/°$ C., and a glass transition temperature, Tg, of about 85° C.

The approximately 10 mm wide strip of the adhesive layer left uncoated by the photogenerator layer was coated with a ground strip layer during a co-coating process. This ground strip layer, after drying at 125° C. in an oven and eventual cooling to room ambient, had a dried thickness of about 14 micrometers. This ground strip was electrically grounded, by conventional means such as a carbon brush contact means during conventional xerographic imaging process. The electrophotographic imaging member web stock, at this point if unrestrained, would spontaneously curl upwardly into a 1½ inch diameter tube due to the thermal contraction mismatch between the CTL and the substrate support layer, resulting in greater CTL dimensional shrinkage than the substrate support layer, thereby causing substantial internal stress built-up in the CTL. The curled electrophotographic imaging member web stock was used to serve as a control.

CONTROL EXAMPLE II

Another flexible electrophotographic imaging member web stock was prepared by following the procedures and using materials as described in the Control Example I, but with the exception that the imaging member web stock curling was controlled by application of an anticurl backing layer to render imaging member web stock flatness.

An anticurl backing layer coating solution was prepared by combining 8.82 grams of polycarbonate resin (Makrolon 5705, available from Bayer A G), 0.72 gram of polyester resin (Vitel PE-200, available from Goodyear Tire and Rubber Company) and 90.1 grams of methylene chloride in a glass container to form a coating solution containing 8.9 percent by weight solids. The container was covered tightly and placed on a roll mill for about 24 hours until the polycarbonate and polyester were dissolved in the methylene chloride to form the anticurl coating solution. The anticurl backing layer coating solution was then applied to the rear surface of the substrate support layer (the side opposite the photogenerator layer and charge transport layer) of the imaging member web stock and dried at 125° C. to produce a dried anticurl backing layer thickness of about 13.5 micrometers. The resulting electrophotographic imaging member web stock had the desired flatness and is a complete imaging member device. The fabricated electrophotographic imaging member web stock was also used to serve as an imaging member control.

INVENTION EXAMPLE I

The flexible electrophotographic imaging member web stock device of Control Example II was used as follows. In essence, the imaging member web stock was unwound from a 6,000 feet roll-up imaging member supply roll and was directed (with the CTL facing outwardly, under a one pound per linear inch width web tension, and a web stock transport speed of about 10 feet per minute) toward a one-inch outer diameter free rotation processing treatment metal tube 206 having an arcuate outer surface 210, and an annulus 209. The imaging member web stock, under 25° C. ambient temperature, made an entering contact at 12 O'clock with the tube 206 and conformed to the arcuate surface 210. A powerful infrared emitting tungsten halogen quartz heating source 103, positioned directly above, brought upon an instant localized temperature elevation to the CTL to about 10° C. above its Tg to facilitate molecular motion and effect instant stress release from the CTL while the segment of the imaging member web stock was in bending conformance contact over the arcuate surface 210. The heating source 103 was an integrated unit having a length sufficiently covering the whole width of the imaging member segment; it consists of a hemi-ellipsoidal cross-section elongated reflector 106 and a halogen quartz tube 105 positioned at one focal point inside the reflector 106 such that all the infrared radiant energy emitted form tube 105 was reflected and converged at the other focal point outside the reflector 106 to give a 6 millimeters width focused heating region 108 that effected instant CTL temperature elevation beyond its Tg.

The heated segment of CTL after exposure to the heating region 108 began to cool down to below the glass transition temperature, through direct heat conduction to tube 206 and heat transfer to ambient air, as the imaging member web stock in continuous motion was transported away from heat source 103. A further and final CTL cooling was assured by air impingement from an air knife directing a high velocity narrow stream of cool air of about 19° C. onto the surface of the imaging member from a 90 psi air supply line positioned at 4 O'clock to the tube 206 prior to the imaging member web stock segment emerging from the curved contact zone region to complete the treatment process.

INVENTION EXAMPLE II

The flexible electrophotographic imaging member web stock having no anticurl back coating layer, prepared according to Control Example I, was similarity CTL stress release treated by the procedures described in the preceding Invention Example I to give good results, but with the exception that the air impingement cooling device was replaced by by the cooling system 203 of FIG. 1 employing a polyvinylalcohol hydrophilic cooling foam roll saturated and partially submersed in a water cooling bath. The temperature of the water cooling bath was about 5 degrees C. The foam roll was driven by movement of the imaging member web stock. After being subjected to the inventive method, the imaging member web stock was free of upward edge curling.

COMPARATIVE EXAMPLE I

The flexible electrophotographic imaging member web stock having no anticurl backing layer, prepared according to Control Example I, was treated according to a prior art method. In brief, the imaging member web stock emerged from a coater oven at a temperature of about 100° C. (15° C. above the Tg of the CTL), with a one pound per linear inch width applied web tension, and a web stock transporting speed of 70 feet per minute. The distance between the coater oven exit and the beginning of the contact zone was about 2 feet. The web stock was directed towards a one inch diameter metal treatment tube maintained by a constant 15° C. cooling water passing though the treatment tube annulus. The transported hot imaging member web stock made a 12 O'clock entering contact with the treatment tube and remained in constant contact to the surface of the treatment tube without employing any external cooling device for further CTL cooling prior to the web stock leaving the treatment tube at 6 O'clock position (i.e., a wrap angle of about 180 degrees), such cooling to complete the imaging member web stock treatment in a continuous process. Surprisingly, the imaging member web stock obtained after through this particular processing treatment was not effective to totally eliminate the edge curl problem.

MECHANICAL BELT CYCLING TEST EXAMPLE

The flexible electrophotographic imaging member web stocks of Control Example II and Invention Examples I and II were each cut to precise dimensions of 440 mm width and 2,808 mm in length. The opposite ends of each cut imaging member sheet was secured to give 1 millimeter overlap and ultrasonically welded, utilizing 40 KHz horn frequency, in the long dimension, to form a seamed flexible imaging member belt for fatigue dynamic electrophotographic imaging test in a selected xerographic machine.

Prior to carrying out the dynamic cycling belt test, the seam splashings were measured and analyzed with the use of a Wyko Gauze NT-200 for physical dimemsions. The seam of imaging member belts prepared from web stock having the material composition and structure of Control Example II and Invention Example I gave an average seam splashing height of about 79 micrometers and a width of about 0.85 millimeter. By comparison, the splashings of the seamed belt prepared from the imaging member web stock of Invention Example II had about 40% splash size reduction both in height and width directions since that imaging member had a simplified material make-up structure with no anticurl backing layer in the molten mass ejection to form seam splashing.

The dynamic machine belt cycling test results obtained showed that the onset of seam cracking/delamination failure was significantly delayed by about 2 times for the imaging member belts prepared with the web stock treated by the inventive methods of Invention Examples I and II as compared to the seam life for the belt prepared from the non-stress release treated web stock of Control Example II. The results seen for belt flexing induced charge transport layer fatigue cracking due to constant dynamic bending over machine belt support module rollers were even more encouraging because the onset of charge transport layer cracking was notably delayed by almost 4 times for the belts fabricated with the imaging member web stocks of Invention Examples I and II as compared with the control belt counterpart prepared from the web stock of Control Example II.

The physical analysis and mechanical belt cycling test results seen in seam splashing size reduction, fatigue seam cracking/delamination failure suppression, and significant charge transport layer cracking life extension were all achieved for the belts prepared using the imaging member web stocks treated with the present stress release method. The present method also did not adversely affect the chemical, mechanical, or electrical properties of the imaging member, thereby maintaining the dedicate photo-electrical function of the imaging member.

Other modifications of the present invention may occur to those skilled in the art based upon a reading of the present disclosure and these modifications are intended to be included within the scope of the present invention.

We claim:

1. A method of creating a flexible multi-layer member exhibiting a glass transition temperature and including a surface layer, the method comprising:

moving the member through a member path comprising: a contact zone defined by contact of the member with an arcuate surface including a curved contact zone region; a pre-contact member path before the contact zone; and a post-contact member path after the contact zone;

heating sequentially each portion of the surface layer such that each of the heated surface layer portions has a temperature above the glass transition temperature while in the curved contact zone region; and cooling sequentially each of the heated surface layer portions while in the contact zone such that the temperature of each of the heated surface layer portions falls to below the glass transition temperature prior to each of the heated surface layer portions exiting the curved contact zone region, thereby defining a cooling region, wherein the heating is accomplished in a heating region encompassing any part or all of the contact zone outside the cooling region and a portion of the pre-contact member path adjacent the contact zone wherein the member is moved at a constant speed through the contact zone.

2. The method of claim 1, wherein the heating raises each of the heated surface layer portions to a temperature ranging from about 5 to about 40 degrees C. above the glass transition temperature.

3. The method of claim 1, wherein the cooling lowers each of the heated surface layer portions to a temperature at least about 20 degrees lower than the glass transition temperature.

4. The method of claim 1, wherein the cooling lowers each of the heated surface layer portions to a temperature at least about 40 degrees lower than the glass transition temperature.

5. The method of claim 1, wherein the member is a web or a belt.

6. The method of claim 1, wherein the cooling comprises transferring heat away from the member via heat conduction through the arcuate surface and via heat convection to ambient air.

7. The method of claim 6, wherein the cooling further comprises transferring heat away from the member via heat conduction or heat convection to a coolant.

8. The method of claim 6, wherein the cooling is accomplished without transferring heat away from the member via heat conduction or heat convection to a coolant.

9. The method of claim 1, wherein the arcuate surface is non-rotatable.

10. The method of claim 1, wherein the arcuate surface rotates.

11. The method of claim 1, wherein the contact zone further includes two straight contact zone regions and therebetween the curved contact zone region.

12. The method of claim 1, wherein the member contacts the arcuate surface at a wrap angle ranging from about 30 to about 350 degrees.

13. The method of claim 1, wherein the member contacts the arcuate surface at a wrap angle of about 180 degrees.

14. The method of claim 1, wherein the surface layer exhibits the glass transition temperature.

15. The method of claim 1, wherein the member includes a layer adjacent to the surface layer that exhibits the glass transition temperature and the surface layer exhibits a different glass transition temperature.

16. The method of claim 1, wherein the member further includes an additional layer, wherein due to heat conduction within the member, the heating sequentially of each portion of the surface layer also causes heating sequentially of each portion of the additional layer such that each of the heated additional layer portions has a temperature above the glass transition temperature while in the curved contact zone region, wherein due to heat conduction within the member, the cooling sequentially of each of the heated surface layer portions also causes cooling sequentially of each portion of the additional layer such that the temperature of each of the heated additional layer portions falls to below the glass transition temperature prior to each of the heated additional layer portions exiting the curved contact zone region.

17. A method of treating a flexible imaging member comprised of in the following sequence a substrate layer, a charge generating layer, and a charge transport layer wherein the charge transport layer exhibits a glass transition temperature, the method comprising:

moving the member through a member path comprising: a contact zone defined by contact of the member with an arcuate surface including a curved contact zone region; a pre-contact member path before the contact zone; and a post-contact member path after the contact zone;

heating sequentially each portion of the charge transport layer such that each of the heated charge transport layer portions has a temperature above the glass transition temperature while in the curved contact zone region; and cooling sequentially each of the heated charge transport layer portions while in the contact zone such that the temperature of each of the heated charge transport layer portions falls to below the glass transition temperature prior to each of the heated charge transport layer portions exiting the curved contact zone region, thereby defining a cooling region, wherein the heating is accomplished in a heating region encompassing any pan or all of the contact zone outside the cooling region and a portion of the pre-contact member path adjacent the contact zone wherein the member is moved at a constant speed through the contact zone.

* * * * *